United States Patent [19]

Motozawa et al.

[11] Patent Number: 4,968,059
[45] Date of Patent: Nov. 6, 1990

[54] SEAT BELT RETRACTOR SYSTEM HAVING SEAT BELT TIGHTENING MEANS

[75] Inventors: Yasuki Motozawa; Takayuki Sugama, both of Saitama, Japan

[73] Assignee: Honda Giken Kogyo Kabushiki Kaisha, Tokyo, Japan

[21] Appl. No.: 333,079

[22] Filed: Apr. 4, 1989

[30] Foreign Application Priority Data

Apr. 8, 1988 [JP] Japan .............................. 63-47414[U]
Apr. 8, 1988 [JP] Japan .............................. 63-47412[U]

[51] Int. Cl.⁵ ............................................ B60R 22/42
[52] U.S. Cl. .................................... 280/806; 280/807; 280/808
[58] Field of Search ............... 280/801, 802, 804, 806, 280/807, 808

[56] References Cited

U.S. PATENT DOCUMENTS

| | | | |
|---|---|---|---|
| 4,508,287 | 4/1985 | Nilsson | 280/806 |
| 4,550,951 | 11/1985 | Apri | 280/806 |
| 4,772,046 | 9/1988 | Salomonsson et al. | 280/806 |
| 4,840,325 | 6/1989 | Higuchi et al. | 280/806 |
| 4,864,086 | 9/1989 | Akiyama et al. | 200/61.53 |

FOREIGN PATENT DOCUMENTS 58-14337 3/1983 Japan .

*Primary Examiner*—Charles A. Marmor
*Assistant Examiner*—Tamara L. Finlay
*Attorney, Agent, or Firm*—Armstrong, Nikaido, Marmelstein, Kubovcik & Murray

[57] ABSTRACT

A seat belt retractor system comprising a seat belt retractor unit having a winding spool for winding a seat belt thereon, and a seat belt tightening unit for tightening the seat belt upon detection of occurrence of a vehicle crash. The seat belt tightening unit is placed lower than the seat belt retractor unit, for instance, one on top of a floor tunnel and the other on a side wall of the floor tunnel, whereby the seat belt can be favorably passed closely across the waist and the shoulder of the vehicle occupant and a favorable occupant restraining capability of the seat belt is ensured. If the seat belt tightening unit uses an explosive propellant, it may be placed externally of the passenger compartment, for instance on the external wall surface of the floor tunnel, so as to eliminate any ill effects, such as explosive sound and combustion gas, which may be produced as a result of the combustion of the propellant.

9 Claims, 5 Drawing Sheets

SEAT BELT RETRACTOR SYSTEM HAVING SEAT BELT TIGHTENING MEANS

TECHNICAL FIELD

The present invention relates to a seat belt retractor system having means to tighten the seat belt upon detection of a deceleration level indicative of a vehicle crash, and in particular to such a seat belt retractor system which is highly effective in restraining the vehicle occupant in case of a vehicle crash.

BACKGROUND OF THE INVENTION

Seat belts are particularly effective when they are worn by the vehicle occupants closely upon their bodies and the slack in the seat belts is minimized. However, as this will cause considerable discomfort to the wearers, retractor devices are widely used with seat belts so as to accommodate the movement of the seat belt wearers by using spring loaded winding spools.

As such a retractor device, the emergency lock retractor device has recently come to be widely used so that the movement of the occupant may not be restrained under normal condition but the winding spool may be locked up instantaneously upon detection of deceleration or rapid pay-out of the seat belt resulting from occurrence of a vehicle crash or a sudden braking to ensure an appropriate level of the tension of the seat belt.

However, even when such a retractor device is used, it is desired to minimize the initial slack of the seat belt for the seat belt to function most effectively.

To achieve this goal, various preloader devices have been proposed, such as those disclosed in U.S. Pat. No. 4,840,325 and U.S. Pat. No. 4,864,086 07/030,630, filed Mar. 27, 1987, now U.S. Pat. No. 4,840,325, dated June 20, 1989 and 07/132,257, filed Dec.14, 1987, now U.S. Pat. No. 4,864,086, dated Sept. 5, 1989, respectively, which improve the capability of the seat belt system to restrain a vehicle occupant by clamping a part of the seat belt paid out from the retractor device and pulling the clamped part towards the retractor device in response to a signal from a deceleration sensor for detecting deceleration greater than a certain level acting upon a vehicle. The disclosure of these copending applications are incorporated herein by reference.

On the other hand, a seat belt is useful only when it is worn by the vehicle occupant, and it may therefore prove to be quite useless if the occupant fails to wear it. Therefore, various passive seat belt devices have been proposed, such as the one disclosed in Japanese Pat. publication No. 58-14337 in which an end of a seat belt is automatically moved between a position not to obstruct the boarding and unboarding of the vehicle occupant and another position for restraining the movement of the vehicle occupant, according to the opening and closing action of the vehicle door.

Such a seat belt winding device is typically disposed between a pair of seats. To the end of maximizing the protection of the vehicle occupant, the seat belt is desired to be arranged as closely to the vehicle occupant as possible, and the seat belt outlet of the winding device is desired to be placed lower than the waist of the vehicle occupant. However, a retractor device and a preloader device are required to be equipped to each one of a pair of laterally arranged seats, and placing the seat belt outlet as mentioned above tends to create problems due to various restrictions on layout.

BRIEF SUMMARY OF THE INVENTION

In view of such problems of the prior art, a primary object of the present invention is to provide a seat belt retractor system which can effectively restrain a vehicle occupant in case of a vehicle crash.

A second object of the present invention is to provide a seat belt retractor system which requires a relatively small space for installation.

A third object of the present invention is to provide a seat belt retractor system which is suitable for use with a passive seat belt system using a seat belt having one end actuated in synchronism with the boarding and unboarding of the vehicle occupant.

A fourth object of the present invention is to provide a seat belt retractor system which uses a propellant having a large power output as a power source for its preloader unit but is free from the discomforts due to the explosive sound and the combustion gas produced by the combustion of the propellant.

These and other objects of the present invention can be accomplished by providing: a seat belt retractor system, comprising: a deceleration sensor for detecting deceleration exceeding a certain prescribed level indicative of occurrence of a vehicle crash; a seat belt retractor unit, mounted on a first part of a vehicle body, having a winding spool for winding a seat belt thereon; and a seat belt tightening unit, mounted on a second part of the vehicle body which is lower than the first part, which clamps a part of the seat belt extending out of the seat belt retractor unit and pulls the seat belt toward the seat belt retractor unit according to a signal from the deceleration unit.

By thus individually arranging a retractor unit for winding and retracting a seat belt and a preloader unit for ensuring a proper tensioning of the seat belt upon occurrence of a vehicle crash, the layout efficiency related to the arrangement of the seat belt is improved. Further, the effective position of the seat belt outlet may be selected to be lower than the seating surface of the seat so that the seat belt may be more closely passed along the waist of the vehicle occupant than was possible heretofore.

According to a preferred embodiment of the present invention, the first part of the vehicle body is a top part of a floor tunnel, and the second part is a side wall of the floor tunnel. This layout not only ensures a satisfactory performance of the seat belt but also saves the space required for installing it. Preferably, an outlet end of the seat belt tightening unit is provided in a lower part thereof so as to place the outlet end at a lowest possible position.

If the seat belt tightening unit comprises a drive unit using an explosive propellant as its power source, a large power output can be obtained for sufficient tensioning of the seat belt upon occurrence of a vehicle crash, and the emission of combustion gas and an explosive combustion noise can be expelled out of the passenger compartment without substantially affecting the vehicle occupant. Particularly when drive power from the drive unit is transmitted to the main part of the seat belt tightening unit by way of a wire, the drive unit can then be placed even at a remote location.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
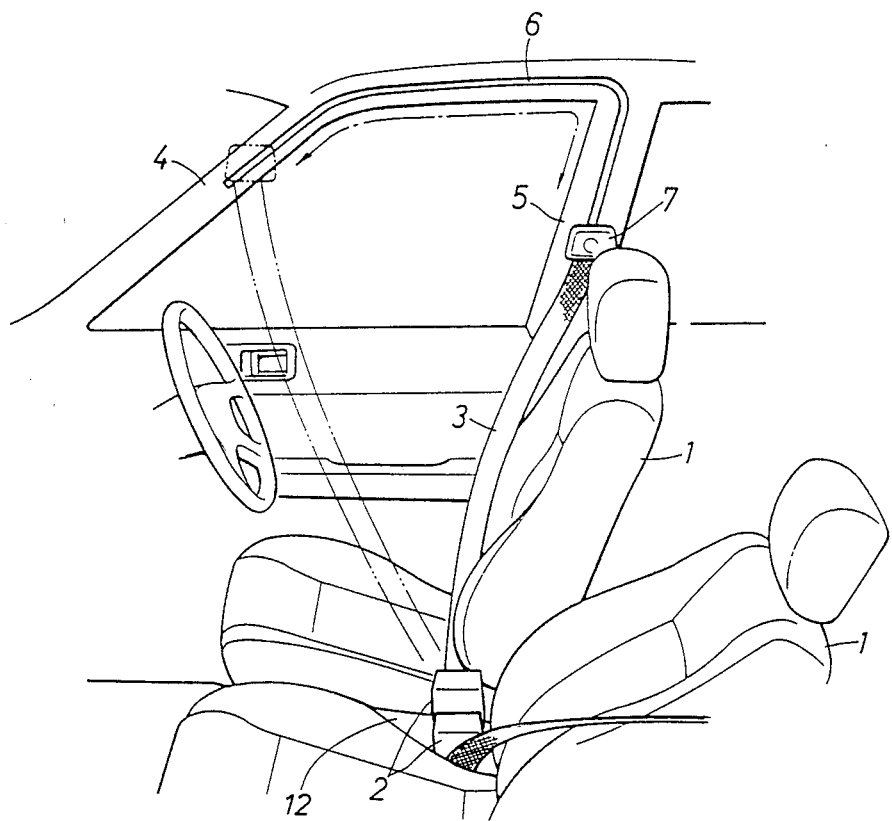
FIG. 1 is a perspective view of a front seat part of a vehicle.

FIG. 1 shows a passenger compartment of a vehicle to which the present invention is applied. The front seats of this vehicle consist of a pair of seats 1 which are divided into a driver's seat and a passenger seat, and a pair of retractor units 2 are mounted on top of a floor tunnel 12 formed in the part of the floor located between the seats 1 so as to correspond to the respective seats. Each of these retractor units 2 is always biased in the direction to retract the seat belt 3 thereinto, and is equipped with an emergency lock device of a known type so that the winding and paying out of the seat belt 3 may be performed according to the movement of the vehicle occupant without involving substantially any resistance under normal condition, but the winding pulley therein may be locked upon sudden braking so as to prohibit any further pay out of the seat belt 3.

A guide rail 6 extends along the part of the vehicle body located above a front side window, from a front pillar 4 to a center pillar 5, and a slide anchor 7 is slidably engaged with this guide rail 6. To the slide anchor 7 is fixedly secured an end of the seat belt 3 taken out from the retractor unit 2.

The slide anchor 7 is, for instance, moved by an electric motor in such a manner as to move automatically towards the front pillar 4 when the door is opened or when the vehicle occupant is about to board or unboard the vehicle, and to a height of the center pillar 5 which is suitable for passing the seat belt 3 across the waist and shoulder of the vehicle occupant when the door is closed.

Figure 2:
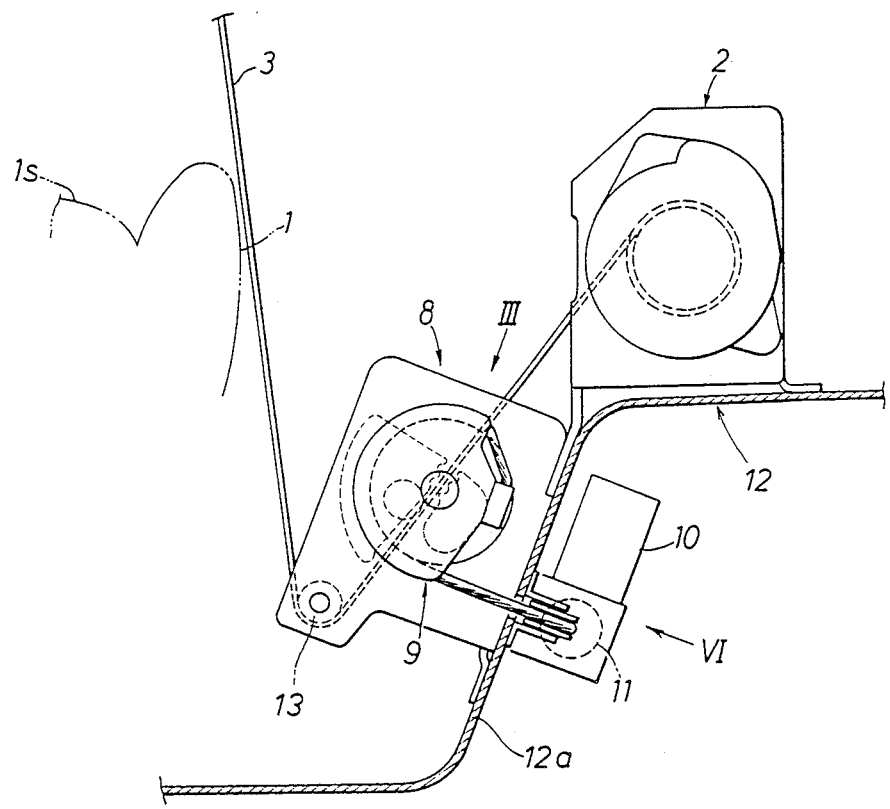
FIG. 2 is an enlarged front view of the layout of the retractor unit and the preloader unit.

As shown in FIG. 2, the seat belt 3 taken out from the retractor unit 2 extends downwards therefrom along a side wall 12a of the floor tunnel 12 and, after passing through a preloader unit 8, extends upwards therefrom, before its end portion is secured to the aforementioned slide anchor 7.

The preloader unit 8 consists of a pulling unit 9 for clamping and pulling a part of the seat belt 3 taken out of the retractor unit 2, a deceleration sensor 10 for detecting only such an impulsive deceleration which would be produced in case of a vehicle crash by displacement of an inertia mass supported by spring means in a floating manner and producing a signal indicative thereof, and a drive unit 11 for driving the pulling unit 9 with the energy of a propellant which rapidly burns in response to the signal from the deceleration sensor 10. The pulling unit 9 is fixedly secured to a lower part of the side wall 12a of the floor tunnel 12 lower than the level of the seat cushion surface 1s, while the deceleration sensor 10 and the drive unit 11 are mounted on the external wall surface of the floor tunnel 12 facing the exterior of the passenger compartment.

Figure 3:
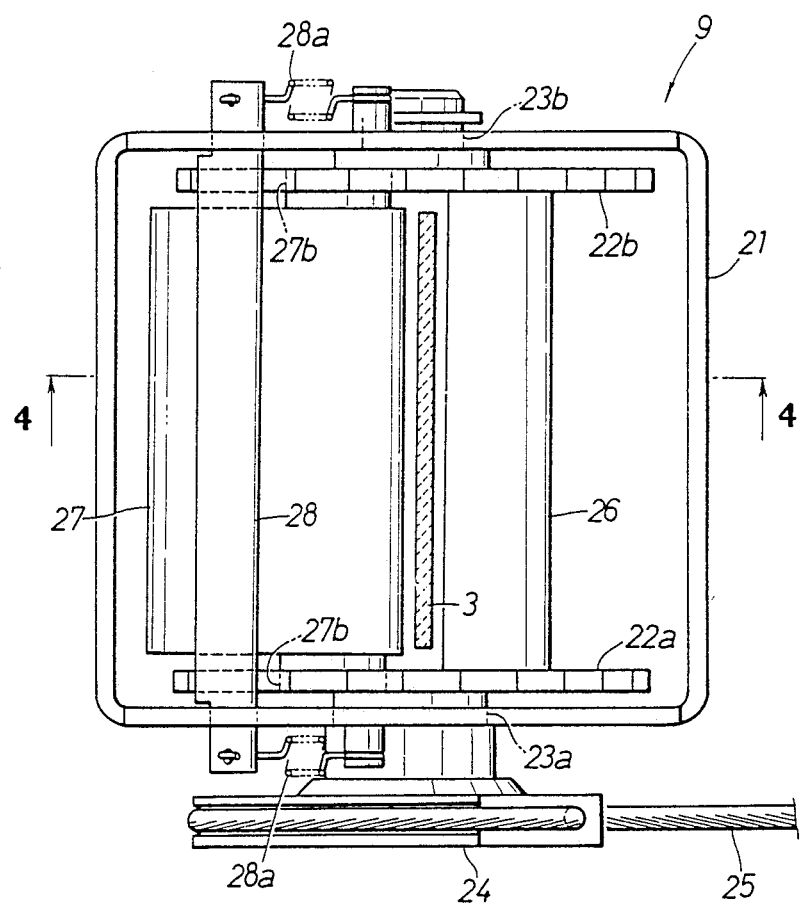
FIG. 3 is a view as seen from the arrow III in FIG. 2 with a part in section.

As shown in FIG. 3, the casing 21 of the pulling unit 9 is made by bending metallic plate, and on its inner surface are pivotally supported a pair of ratchet wheels 22a and 22b by means of stub shafts 23a and 23b, respectively. The ratchet wheels 22a and 22b and the stub shafts 23a and 23b are integrally connected to each other by a fixed cam member 26 as described hereinafter, and a pulley 24 is fixedly secured to an end of one of the stub shafts 23a projecting out of the casing 21. Upon this pulley 24 is wound a wire 25 which has one end coupled to the drive unit 11 as described in greater detail hereinafter and another end which is fixedly secured to a suitable part of the pulley 24 so that a rotary motion may be caused to the pulley 24 when the wire 25 is pulled by the drive unit 11 away from the pulley 24.

Figure 4:
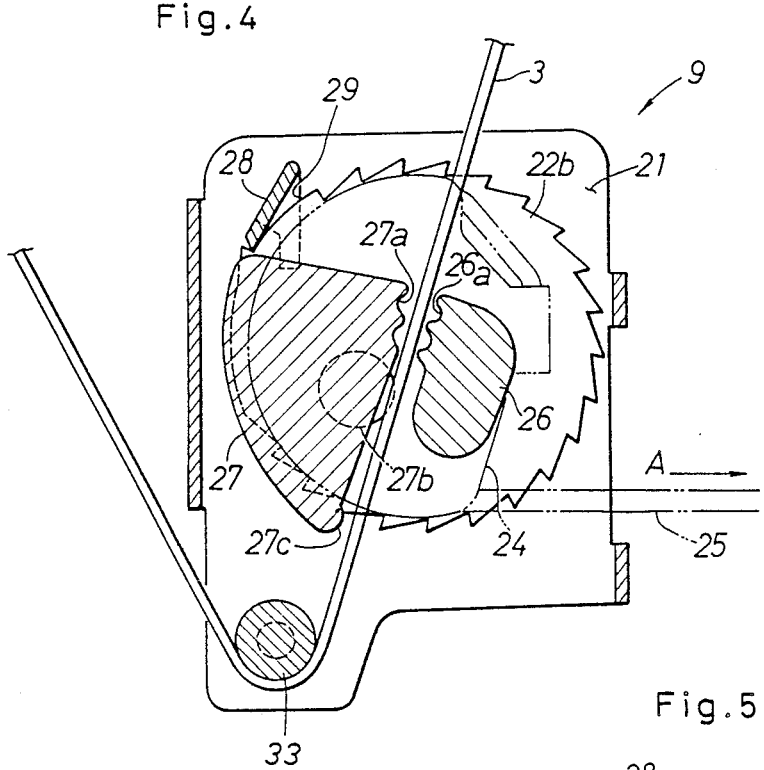
FIG. 4 is a sectional view taken along line IV—IV of FIG. 3.

Referring to FIG. 4 as well as to FIG. 3, the fixed clamp cam 26 is fixedly secured between eccentric parts of the inner surfaces of the ratchet wheels 22a and 22b so as to connect the two ratchet wheels 22a and 22b to each other. A moveable clamp cam 27 is pivotally supported between the ratchet wheels 22a and 22b by way of a pivot shaft 27b so as to oppose the fixed clamp cam 26. The opposing surfaces of the fixed clamp cam 26 and the moveable clamp cam 27 are each provided with a plurality of complementary clamp grooves 26a and 27a extending over the entire length thereof.

Figure 5:
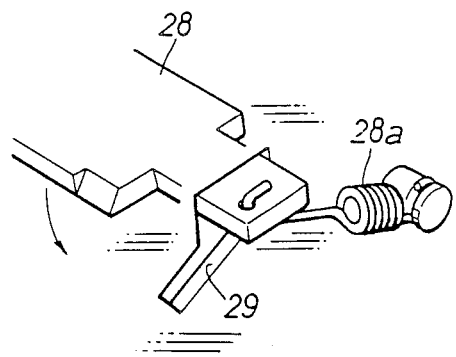
FIG. 5 is an enlarged perspective view of an essential part of the ratchet pawl and one of the biasing springs therefor.

A ratchet pawl 28 consisting of a planar member having an elongated rectangular shape extends in an upper part of the casing 21 in parallel with the axial line of the stub shafts 23a and 23b so as to come into sliding engagement with the outer circumferential edges of the ratchet wheels 22a and 22b. The two lateral ends of the ratchet pawl 28 are received in openings 29 provided in the side walls of the casing 21 so that it can pivot around its upper edge into and out of contact with the ratchet wheels 22a and 22b at its lower edge, as shown in FIG. 5. Further, a pair of tension coil springs 28a are engaged between either end of the ratchet pawl 28 and the corresponding part of the casing 21 for urging the lower edge of the ratchet pawl 28 against the toothed peripheral edges of the ratchet wheels 22a and 22b (FIG. 5).

Figure 6:
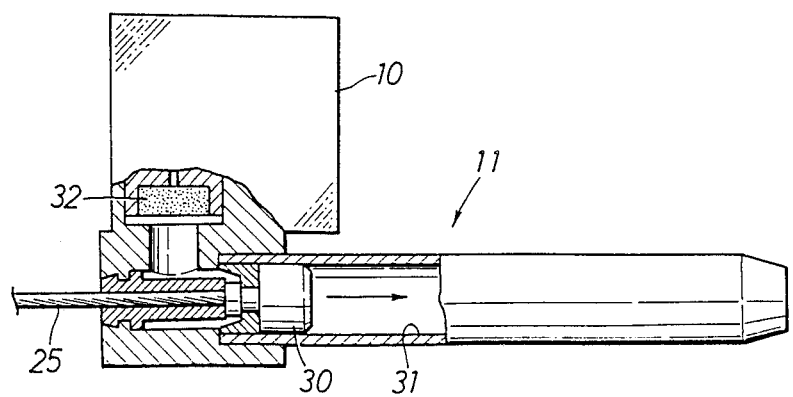
FIG. 6 is a view as seen from the arrow VI in FIG. 2 with a part broken away.

As shown in FIG. 6, the drive unit 11 consists of a cylinder 31 receiving a piston 30 therein in a slidable manner, and a propellant 32 received in the base end of the cylinder 31, and an end of the aforementioned wire 25 is connected to the piston 30. The propellant 32 is adapted to be ignited by a firing pin (not shown in the drawings) which is activated by the deceleration sensor 10.

Now the operation of the above described embodiment is described in the following with reference to FIGS. 4, 7 and 8.

The pulling unit 9 is normally in the state shown in FIG. 4, and the seat belt 3 paid out from the retractor unit 2 is passed through the gap between the two clamp cams 26 and 27 before it extends upwardly via a guide roller 33. Here, the seat belt 3 is out of contact with the two clamp cams 26 and 27, and can be freely paid out or retracted as required.

When an acceleration level exceeding a certain prescribed level in the direction of the progress of the vehicle is detected by the deceleration sensor 10 upon occurrence of a vehicle crash, the propellant 32 is ignited in response to a signal from the deceleration sensor 10, and the thrust acting upon the piston 30 as a result of the combustion of the propellant 32 pulls the wire 25 in the direction indicated by the arrow A in FIG. 4.

Figure 7:
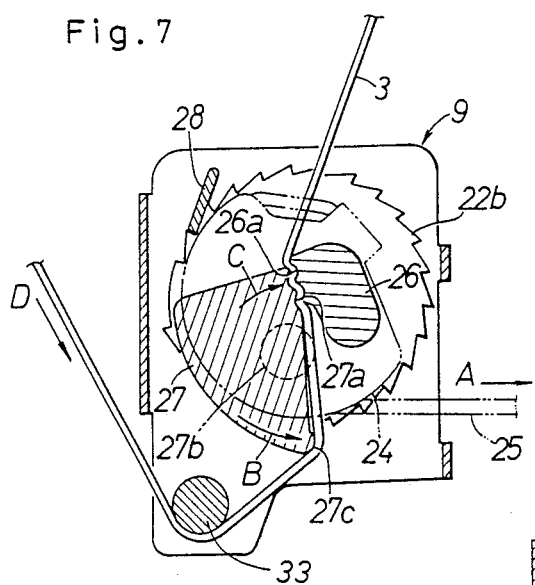
FIGS. 7 and 8 are views similar to FIG. 4 for explaining the operation of the present embodiment in time sequence.

As the wire 25 is pulled, the pulley 24 rotates in the direction indicated by the arrow B, and an end portion 27c of the clamp cam 27 abuts the seat belt 3, as shown in FIG. 7. As a result, the moveable clamp cam 27 is rotated in the direction indicated by the arrow C while pressing upon the seat belt 3, thereby wedging the seat belt 3 between the clamp grooves 26a and 27a. Thus, the part of the seat belt 3 effective for restraining the vehicle occupant is pulled by the end portion 27c in the direction indicated by the arrow D.

Figure 8:
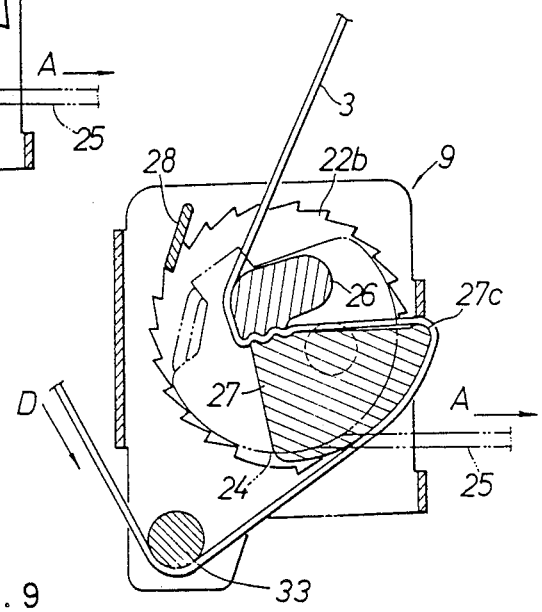

As the wire 25 is pulled further, the end portion 27c of the moveable clamp cam 27 accordingly retracts the seat belt even further (FIG. 8). When the seat belt 3 is completely retracted, the reverse rotation of the pulley 24 is prevented by the engagement between the ratchet wheels 22a and 22b and the ratchet pawl 28, and the tension of the part of the seat belt 3 effective for restraining the vehicle occupant is maintained.

To protect the vehicle occupant at the time of a vehicle crash, the seat belt 3 is required to be placed as close to the body of the vehicle occupant as possible. Therefore, according to this invention, the retractor unit 2 and the preloader unit 8 are made of separate units, and the retractor unit 2 is placed on top of the floor tunnel 12 while the preloader unit 8 is placed in a lower part of one of the side walls 12a of the floor tunnel 12. By doing so, the effective outlet point of the seat belt 3 from the preloader unit 8 may be set at a location which is lower than the seat cushion surface is of the vehicle seat 1, and the seat belt 3 may be passed closely across the waist and shoulder of the vehicle occupant, with the result that the restraint upon the waist of the vehicle occupant is much improved. According to the present embodiment, the seat belt outlet end (roller 33) of the preloader unit 8 is placed at the lowest possible part thereof. When a propellant 32 is used as a drive source, as it is based on a rapid volumetric expansion resulting from an explosive combustion, sound of a considerable amplitude is emitted and a considerable amount of combustion gas is produced upon activation thereof. Therefore, according to the present invention, the drive unit 11 is placed outside of the passenger compartment so as to avoid the explosive sound and the combustion gas from affecting the vehicle occupants.

Figure 9:
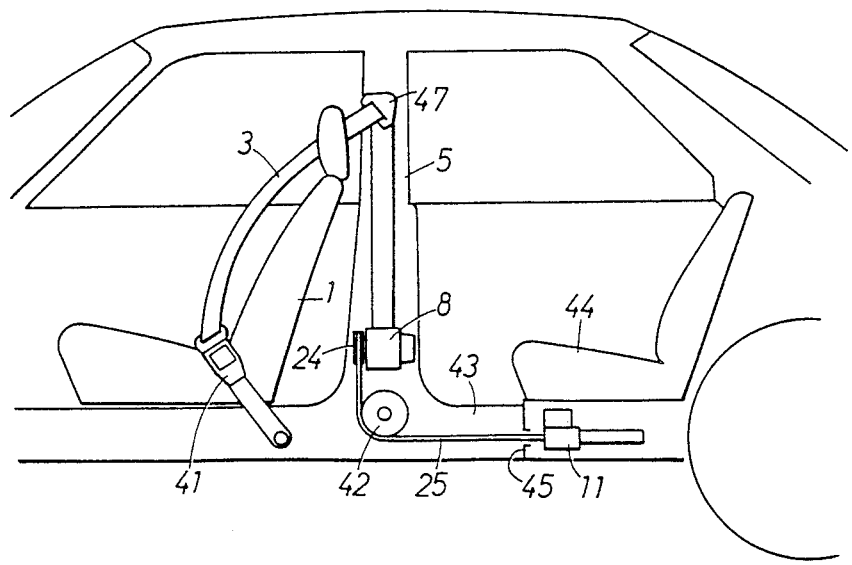
FIG. 9 is a schematic side view illustrating the second embodiment of the present invention.

FIG. 9 shows another embodiment of the present invention, and the parts corresponding to those of the previous embodiment are denoted with like numerals without describing them again in detail.

Whereas the preloader unit 8 was mounted on the floor tunnel 12 in the first embodiment, the preloader unit 8 of the second embodiment is mounted at the base end of the center pillar 5. The preloader unit 8 is integrally formed with the retractor unit 2. And, the seat belt 3 extending upwardly therefrom is passed through a shoulder anchor 47 provided in an upper part of the center pillar 5, and its end portion is engaged with a buckle 41 which is fixedly secured to a part of the vehicle floor portion adjacent to a lower part of the inner side of the front seat 1.

The wire 25 which is passed around the pulley 24 of the preloader unit 8 extends rearwardly along a side sill member 43 by way of a guide sheave 42 and, after passing through a cross member 45 for mounting a rear seat 44 thereon, is connected to the drive unit 11 which is in turn fixedly supported by a member located under the rear seat 44. Since the wire 25 is passed through the interior of the hollow side sill member 43, it would not interfere with the movement of the vehicle occupant or any other component parts of the vehicle. Further, by passing the wire 25 by way of a guide sheave 42, it is possible to arrange the drive unit 11 at a remote location where the sound and the combustion gas from the drive unit 11 would not substantially affect the vehicle occupant. Furthermore, since no large space is required for the installation of the preloader unit, restrictions on the freedom of layout design are reduced to a significant extent. Therefore, a sufficient pulling stroke of the seat belt may be easily attained as an additional advantage.

What is claimed is:

1. A seat belt retractor system, comprising:
   a deceleration sensor for detecting deceleration exceeding a certain prescribed level indicative of occurrence of a vehicle crash;
   a seat belt retractor unit, mounted on a first part of a vehicle body, having a winding spool for winding a seat belt thereon; and
   a seat belt tightening unit means, mounted on a second part of said vehicle body wherein said seat belt tightening unit means is lower than said seat belt retractor unit said seat belt tightening unit means clamping a part of said seat belt extending out of said seat belt retractor unit and pulls said seat belt toward said seat belt retractor unit according to a signal from said deceleration sensor.

2. A seat belt retractor system according to claim 1, wherein said first part of said vehicle body is a top part of a floor tunnel, and said second part is a side wall of said floor tunnel.

3. A seat belt retractor system according to claim 2, wherein said seat belt tightening unit means comprises a drive unit using an explosive propellant as its power source, and said drive unit is mounted on an external wall surface of said floor tunnel.

4. A set belt retractor system according to claim 3, wherein drive power from said drive unit is transmitted to said seat belt tightening unit means by a wire.

5. A seat belt retractor system according to claim 1, wherein an outlet end of said seat belt tightening unit means is provided in a lower part thereof.

6. A seat belt retractor system, comprising:
   a deceleration sensor for detecting deceleration exceeding a certain prescribed level indicative of occurrence of a vehicle crash;
   a seat belt retractor unit having a winding spool for winding a belt thereon;
   a seat belt tightening unit means which clamps a part of said belt extending out of said seat belt retractor unit and pulls said seat belt toward said seat belt retractor unit according to a signal from said deceleration sensor; and
   a drive unit for supplying drive power to said seat belt tightening unit means by using an explosive propellant;
   said drive unit being mounted externally of a vehicle compartment of said vehicle on an external wall surface of a floor tunnel;

the seat belt tightening unit means being mounted internally of the vehicle compartment on an internal wall surface of said floor tunnel.

7. A seat belt retractor system according to claim 6, wherein said drive power from said drive unit is supplied to said seat belt tightening unit means by a wire.

8. A seat belt retractor system according to claim 7, wherein said seat belt tightening unit means is provided beside a front seat, and said drive unit is mounted on a member located under a rear seat, said wire for transmitting said drive power form said drive unit to said seat belt tightening unit means extending longitudinally through a door sill member.

9. A seat belt retractor system according to claim 6, wherein said drive unit includes a wire for transmitting said drive power from said drive unit to said seat belt tightening unit means and said wire is passed through an opening provided in said floor tunnel wall.

* * * * *